(12) United States Patent
Shaw

(10) Patent No.: US 7,368,696 B2
(45) Date of Patent: May 6, 2008

(54) GENERATION AND STORAGE OF COLUMN OFFSETS FOR A COLUMN PARALLEL IMAGE SENSOR

(75) Inventor: Steven Shaw, Berkshire (GB)

(73) Assignee: Micron Technology, Inc., Boise, ID (US)

( * ) Notice: Subject to any disclaimer, the term of this patent is extended or adjusted under 35 U.S.C. 154(b) by 116 days.

(21) Appl. No.: 11/125,096

(22) Filed: May 10, 2005

(65) Prior Publication Data
US 2006/0231734 A1  Oct. 19, 2006

(30) Foreign Application Priority Data
Apr. 14, 2005  (GB) ................. 0507599.9

(51) Int. Cl.
*H04N 3/14* (2006.01)
*H04N 3/335* (2006.01)

(52) U.S. Cl. .................. 250/208.1; 348/302; 348/304; 250/214 R

(58) Field of Classification Search ............ 250/208.1, 250/214 R; 348/214, 243, 245, 247, 302, 348/308, 332
See application file for complete search history.

(56) References Cited

U.S. PATENT DOCUMENTS

| 6,433,822 | B1 | 8/2002 | Clark et al. |
| 6,473,124 | B1 | 10/2002 | Panicacci et al. |
| 6,538,695 | B1* | 3/2003 | Xiao et al. .................. 348/245 |
| 7,154,548 | B2* | 12/2006 | Liu ............................ 348/302 |
| 2005/0094005 | A1* | 5/2005 | Xu ............................. 348/243 |

OTHER PUBLICATIONS

Takayanagi I., et al. "A 1 1/4 inch 8.3M Pixel Digital output CMOS APS for UDTV Application" IEEE Solid-State Circuits Conference, 2003. Digest of Technical Papers. ISSCC. 2003 IEEE International San Francisco, CA, USA US, Feb. 9, 2003, pp. 1-8.

I. Takayanagi, et al., ISSCC 2003 / Session 12 / CMOS Imagers, Sensors and Displays / Paper 12.3, 2003 IEEE International Solid State Circuits Conference.

* cited by examiner

*Primary Examiner*—Georgia Epps
*Assistant Examiner*—Tony Ko
(74) *Attorney, Agent, or Firm*—Dickstein Shapiro LLP

(57) ABSTRACT

The plural signal chains of an imaging device are calibrated in the digital domain. The pixel array of the imaging device includes a row of calibration pixels. The column circuitry, prior to reading a row of pixels, reads the row of calibration pixels in order to obtain a set of column offsets. The row of pixels is read and processed to produce a corresponding plurality of digital values. The set of column offsets are applied to the digital values to compensate for response differences among the signal chains.

29 Claims, 7 Drawing Sheets

GENERATION AND STORAGE OF COLUMN OFFSETS FOR A COLUMN PARALLEL IMAGE SENSOR

FIELD OF INVENTION

The present invention relates generally to CMOS semiconductor imagers. More specifically, the present invention relates to the calibration of plural pixel signal chains in a semiconductor imager having a column parallel architecture.

BACKGROUND OF THE INVENTION

FIG. 1 is an illustration of a conventional four transistor (4T) imager pixel 100 typically used in a CMOS imager. The pixel 100 includes a light sensitive element 101, shown as a photodiode, a floating diffusion charge storage node C, and four transistors: a transfer transistor 111, a reset transistor 112, a source follower transistor 113, and a row select transistor 114. The pixel 100 accepts a TX control signal for controlling the conductivity of the transfer transistor 111, a RST control signal for controlling the conductivity of the reset transistor 112, and a ROW control signal for controlling the conductivity of the row select transistor 114. The voltage at the floating diffusion node C controls the conductivity of the source follower transistor 113. The output of the source follow transistor 113 is presented at node B when the row select transistor 114 is conducting.

The states of the transfer and reset transistors 111, 112 determine whether the floating diffusion node C is coupled to the light sensitive element 101 for receiving photo-generated charge generated by the light sensitive element 101 during a charge integration period, or a source of pixel power VAAPIX from node A during a reset period.

The pixel 100 is operated as follows. The ROW control signal is asserted to cause the row select transistor 114 to conduct. At the same time, the RST control signal is asserted while the TX control signal is not asserted. This couples the floating diffusion node C to the pixel power potential VAAPIX at node A, and resets the voltage at node C to the pixel power potential VAAPIX, less a voltage drop associated with reset transistor 112. The pixel 100 outputs a reset signal Vrst at node B. As will be explained in greater detail below in connection with FIG. 2, node B is typically coupled to a column line 215 (FIG. 2) of an imager 200.

While the transistor 111 is off, the light sensitive element 101 is exposed to incident light and accumulates charges based on the level of the incident light during a charge integration period. After the charge integration period and after the RST control signal is off, thereby turning off reset transistor 112, the TX control signal is asserted. This couples the floating diffusion node C to the light sensitive element 101. Charge flows through the transfer transistor 111 and diminishes the voltage at the floating diffusion node C in accordance with the accumulated charge. The pixel 100 thus outputs a photo signal Vsig at node B.

FIG. 2 is an illustration of an imager 200 that includes a plurality of pixels 100 forming a pixel array 201. Due to space limitations the pixel array 201 is drawn as a 4 row by 4 column array in FIG. 2. One skilled in the art would recognize that most imagers 200 would ordinarily include many more pixels 100 in the array. The imager 200 also includes row circuitry 210, column circuitry 220, a digital processing circuit 240, and a storage device 250. The imager 200 also includes a controller 260, for controlling operations of the imager 200.

The row circuitry 210 selects a row of pixels 100 from the pixel array 201. The pixels 100 in the selected row output their reset and pixel signals Vrst, Vsig to the column circuitry 220, via column output lines 215, which samples and holds the reset and pixel signals Vrst, Vsig for each pixel in a row. The rows are activated one by one in sequence to send successive row signals to column lines 215.

The column circuitry 220 is responsible for converting the pixel reset Vrst and photo Vsig signals into digital values that can then be further processed in the digital domain. In order to do this, the column circuitry 220 samples and holds the reset Vrst and photo Vsig signals produced by each pixel. An analog pixel output signal Vpixel is formed as the difference between the reset Vrst and photo Vsig signals, i.e., Vpixel=Vrst−Vsig. The pixel output signal Vpixel is then converted into a digital value. Imager 200 uses a column parallel architecture, in which the outputs of several pixels 100 in the selected row are simultaneously sampled and held, and converted to digital values.

The digital values are output to the digital processing circuit 240, which performs image processing on the digital values to produce a digital image. The processed digital values are stored in the storage device 250.

The controller 260 is coupled to the pixel array 201, row circuitry 210, column circuitry 220, and storage device 250, and provides control signals to perform the above described processing.

FIG. 3 is a more detailed illustration of the column circuitry 220. The column circuitry 200 comprises a plurality of identical signal chains 301a, 310b. Each signal chain 301a, 301b is coupled to two column output lines 215 from the pixel array 201 (FIG. 2). The column output lines 215 are coupled to a multiplexer 310, which is used to select the signals on one of the two column output lines 215 for subsequent processing.

The first processing stage after the multiplexer 310 is an analog processor circuit 320. The analog processor circuit 320 is used to sample and hold the reset Vrst and photo Vsig signals. Once both signals Vrst, Vsig have been sampled and held, the analog pixel output signal Vpixel can be formed as the difference (Vrst−Vsig) of the two analog signals Vrst, Vsig.

The next processing stage is an analog gain stage 330, which conditions the analog signal to a suitable level to be used as an input signal to an analog-to-digital converter (ADC) 340.

The analog-to-digital converter 340 converts the analog Vpixel signal into a corresponding digital value.

The digital value is routed to a demultiplexer 350, and stored in one of the digital storage locations 360 in the signal chain 301a, 301b. The digital storage locations 360 can be read by the digital processing circuit 240 (FIG. 2) to further process the pixel signals in the digital domain.

In the column circuitry 220, the above described processing is performed once for each column output line 215 coupled to each signal chain 301a, 301b. For example, since FIG. 3 illustrates an example circuit 220 where each signal chain 301a, 301b is coupled to two column output lines 215, each signal chain 301a, 301b performs the above described processing twice for each row readout operation. That is, the above described processing is performed in each of the signal chains 301a, 301b a first time for a first one of the column output lines 215 and a second time for a second one of the column output lines 215. The multiplexer 310 and demultiplexer 350 are thus set to respectively select a first one of the two column output lines 215 and storage locations 360, and then select a second one of the two column output lines 215 and storage locations 360.

Although each signal chain 301a, 301b of the column circuitry 220 is designed to have the identical response, different signal chains 301a, 310b are likely to have non-identical responses due to variations inherent in semiconductor fabrication, which may be seen as noise in the images produced by the imager 200 (FIG. 2). Accordingly, there is a need and desire to economically and quickly calibrate multiple signal chains in the column circuitry of an imager to compensate for any variations between the chains.

SUMMARY OF THE INVENTION

Exemplary embodiments of the method and apparatus of the invention provide an imaging architecture in which a pixel array includes a calibration row comprised of calibration pixels. The calibration row can be read by column circuitry of the imaging architecture to obtain a sequence of offset values that can be applied to digital values obtained from imaging pixels. The offset values, when applied to the digital values, permit the imaging architecture to compensate for differences in the response of pixel signal chains used of the imaging architecture.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 4:
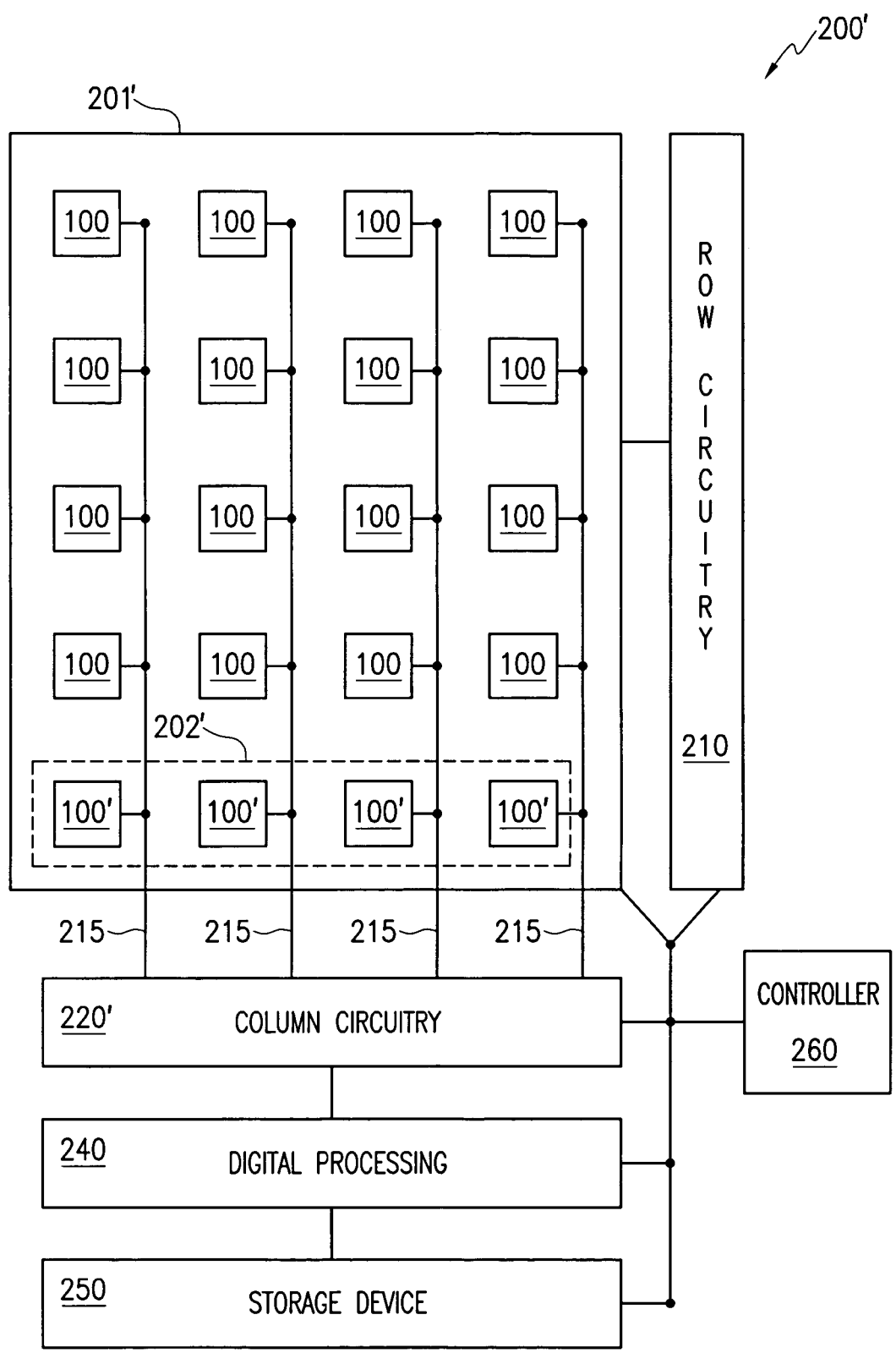
FIG. 4 illustrates an imager constructed in accordance with one exemplary embodiment of the invention.

Now referring to the drawings, where like reference numerals designate like elements, there is shown in FIG. 4, an illustration of an exemplary embodiment of an imager 200' constructed in accordance with a principle of the invention.

Figure 2:
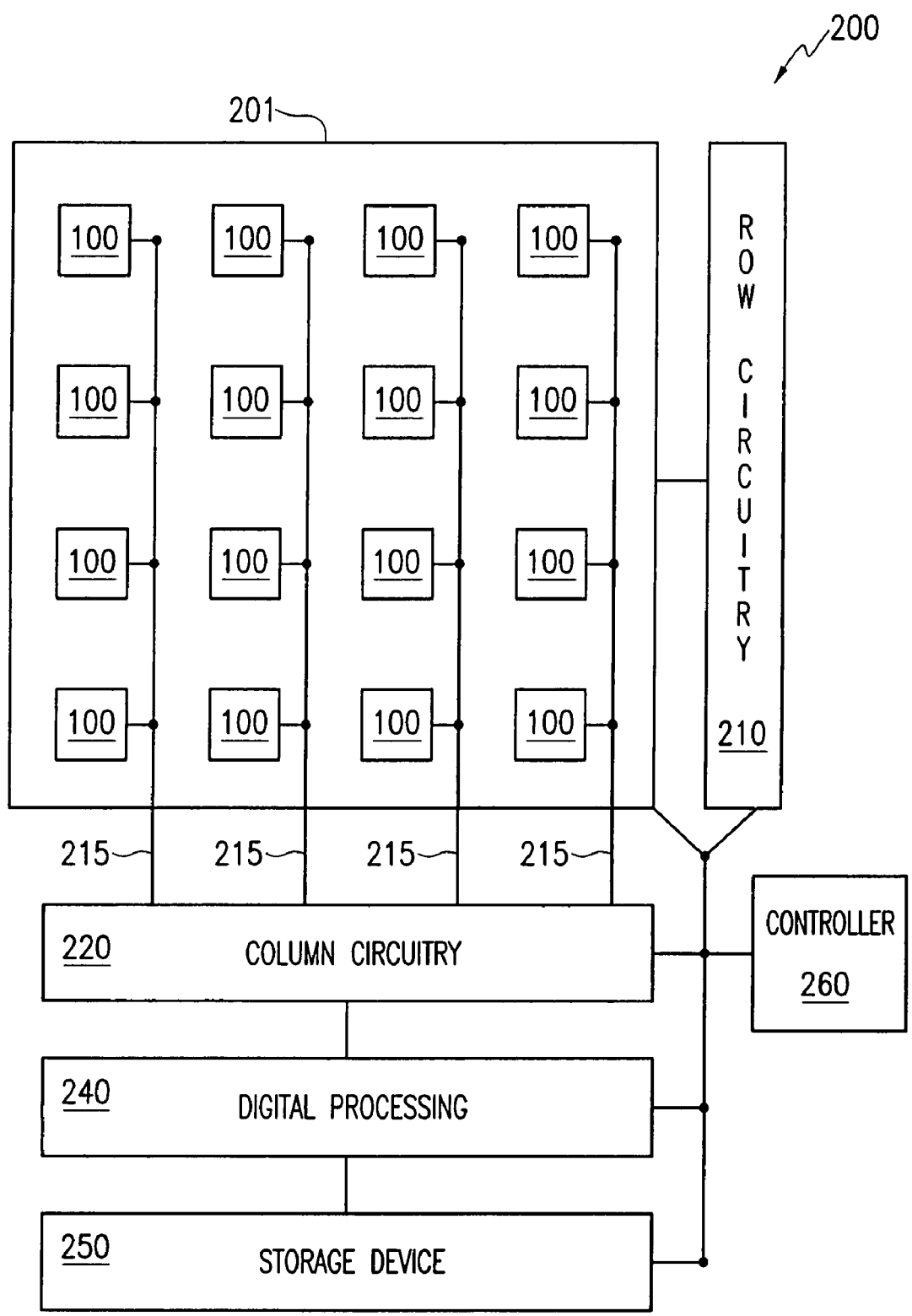
FIG. 2 illustrates an imager utilizing the pixel of FIG. 1.

The imager 200' includes several components of the imager 200 (FIG. 2). These components include the row circuitry 210, digital processing circuit 240, storage device 250, and controller 260. The imager 200' also includes a new pixel array 201' and new column circuitry 220'.

Figure 1:
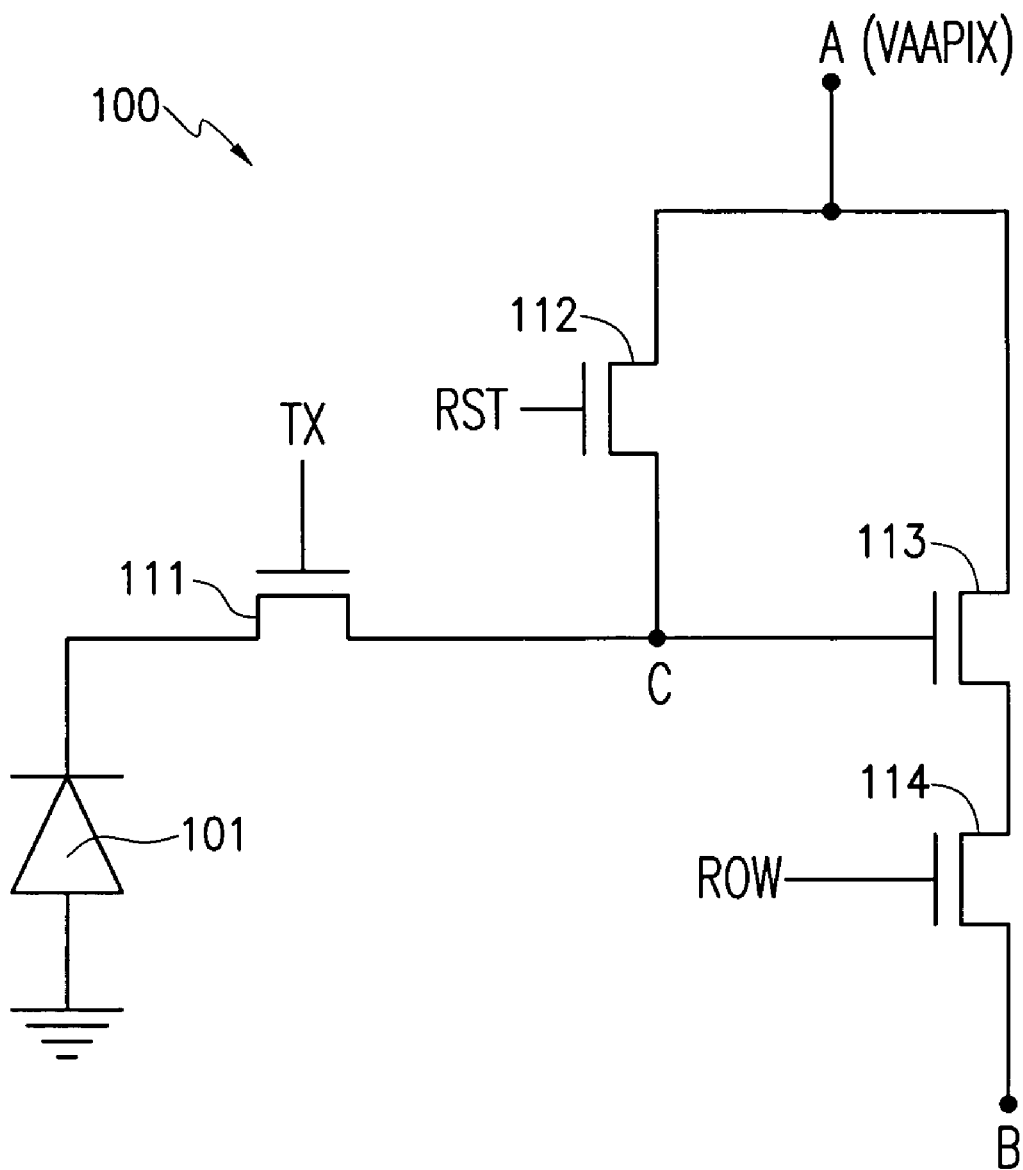
FIG. 1 illustrates a conventional imager pixel.

In FIG. 4, the pixel array 201' is drawn as a 5 row by 4 column array of pixels due to space limitations. One skilled in the art would appreciate that the pixel array 201' would normally have many more than 5 row and 4 columns. In addition to the conventional pixels 100 (FIG. 1) found in a standard imager 200, the pixel array 201' also includes a calibration row 202' of calibration pixels 100'. While each conventional pixel 100 produces reset Vrst and photo Vsig signals that are used to form an output signal Vpixel that varies in accordance with a level of incident light, the calibration pixels 100' are designed to output fixed level calibration signals. In one exemplary embodiment, the fixed level calibration signal corresponds to a zero signal. Thus, each calibration pixel 100' might be a dark pixel, i.e., a pixel identical to the conventional pixel 100 illustrated in FIG. 1, but in which the light sensitive element 101 is shielded from incident light. Such a pixel would output identical reset Vrst and photo Vsig signals, which would permit the column circuitry 220' to form an output signal Vpixel corresponding to the zero signal.

The row circuitry 210 selects a row of pixels 100 from the pixel array 201'. The pixels 100 in the selected row output their reset and pixel signals Vrst, Vsig to the column circuitry 220', via column output lines 215, which samples and holds the reset and pixel signals Vrst, Vsig.

The column circuitry 220' also converts the reset Vrst and photo Vsig signals into digital values, which can then be further processed in the digital domain by the digital processing circuit 240. The column circuitry 220' employs a column parallel architecture in which outputs of plural pixels of the selected row are simultaneously processed by multiple signal chains. As will be explained in greater detail in connection with FIG. 5, the column circuitry 220' also derives, for each column output line 215, an associated calibration value, which is applied in the digital domain to the digital value produced by each signal chain, to produce a corrected digital value.

The corrected digital values are output to the digital processing circuit 240, which performs image processing. The results of the image processing is stored in storage device 250 for further processing or output.

The controller 260 is coupled to the pixel array 201', row circuitry 210, column circuitry 220', and storage device 250, and provides control signals to perform the above described processing.

Figure 3:
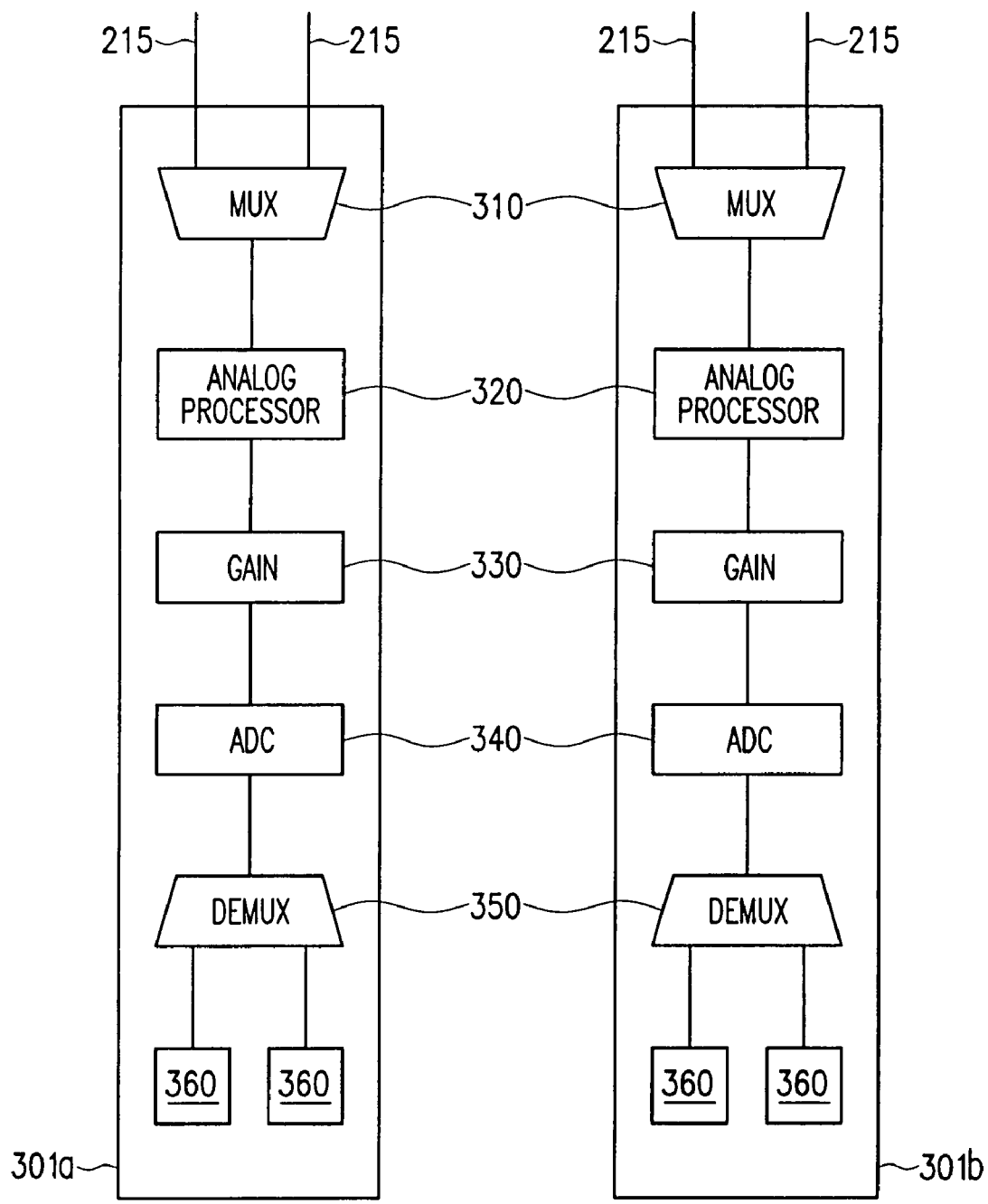
FIG. 3 illustrates column circuitry from the imager of FIG. 2.
Figure 5:
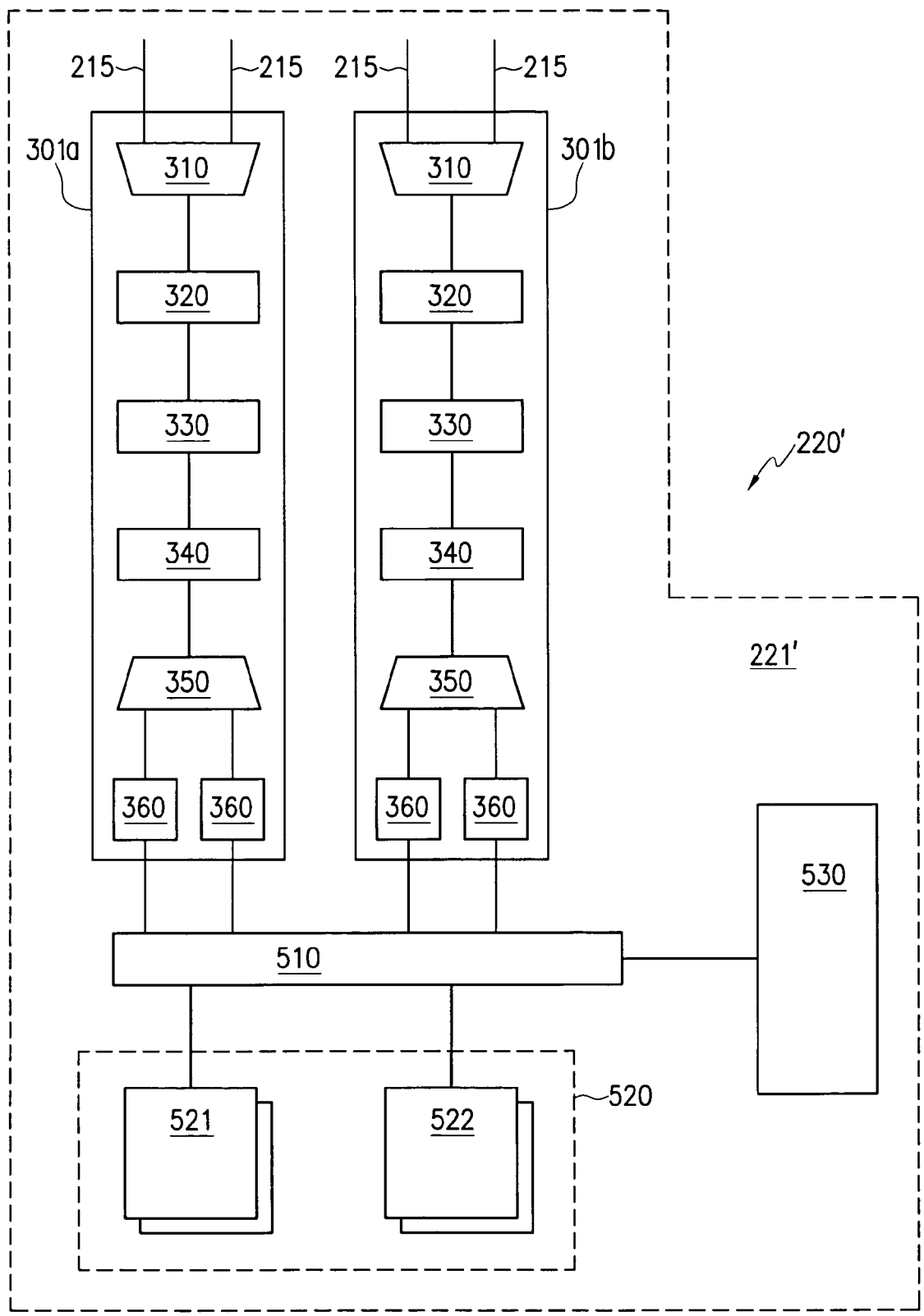
FIG. 5 illustrates column circuitry from the imager of FIG. 4.

FIG. 5 is an illustration of an exemplary embodiment of column circuitry 220' for the imager 200' of FIG. 4. Like column circuitry 220 (FIG. 3), column circuitry 220' includes a plurality of identical signal chains 301a, 301b. Each signal chain 301a, 301b is coupled to plural column output lines 215 from the pixel array 201'. In one exemplary embodiment, each signal chain 301a, 301b is coupled to two column output lines 215. Preferably, one column output line 215 is associated with an odd column of pixels while another column output line 215 is associated with an even column of pixels. The column output lines 215 are coupled to a multiplexer 310, which is used to select the signals on one of the two lines 215 for subsequent processing.

The first processing stage after the multiplexer 310 is an analog processor circuit 320. The analog processor circuit 320 is used to sample and hold the reset Vrst and photo Vsig signals. Once both signals Vrst, Vsig have been sampled and held, the analog pixel output signal Vpixel can be formed as the difference (Vrst−Vsig) of the two signals Vrst, Vsig.

The next processing stage is an analog gain stage 330; this stage 330 applies a controllable gain to condition the analog signal to a suitable level to be used as an input signal to an analog-to-digital converter (ADC) 340.

The analog-to-digital converter 340 converts the analog signal Vpixel into a corresponding digital signal.

The digital signal is routed to a demultiplexer 350, and stored in one of the digital storage locations 360.

Each storage location 360 in each signal chain 301a, 301b is coupled to a bus 510. Also coupled to the bus 510 is an offset memory 520 and a logic circuit 530. The offset memory 520 and logic circuit 530 are used to provide calibrated values to the data stored in storage locations 360. In one exemplary embodiment, the offset memory 520 includes two sets of memory storage locations 521, 522. Each set of memory storage locations may be an individual memory device, so that the offset memory 520 is actually two memory devices 521 and 522. Alternatively, each set of memory storage locations may be a portion of a single memory device 520.

The signal chains 301a, 301b, bus 510, offset memories 521, 522, and logic circuit 530 form a digital pipeline 221'. As illustrated in FIG. 5, the column circuitry 220' includes a single digital pipeline 221'. However, the column circuitry 220' may include plural digital pipelines 221', if desired. Each one of a plurality of digital pipelines 221' may be associated with different rows of the imager. For example, in an imager having R rows there may be S digital pipelines 221', where R and S are integers and R is divisible by S. Each digital pipeline 221' would be respectively associated with a block of R/S rows. In column circuitry 221' with plural digital pipelines 221', the processing below described with respect to FIG. 6 can be performed simultaneously by each digital pipeline 221', thereby increasing processing speed.

Figure 6:
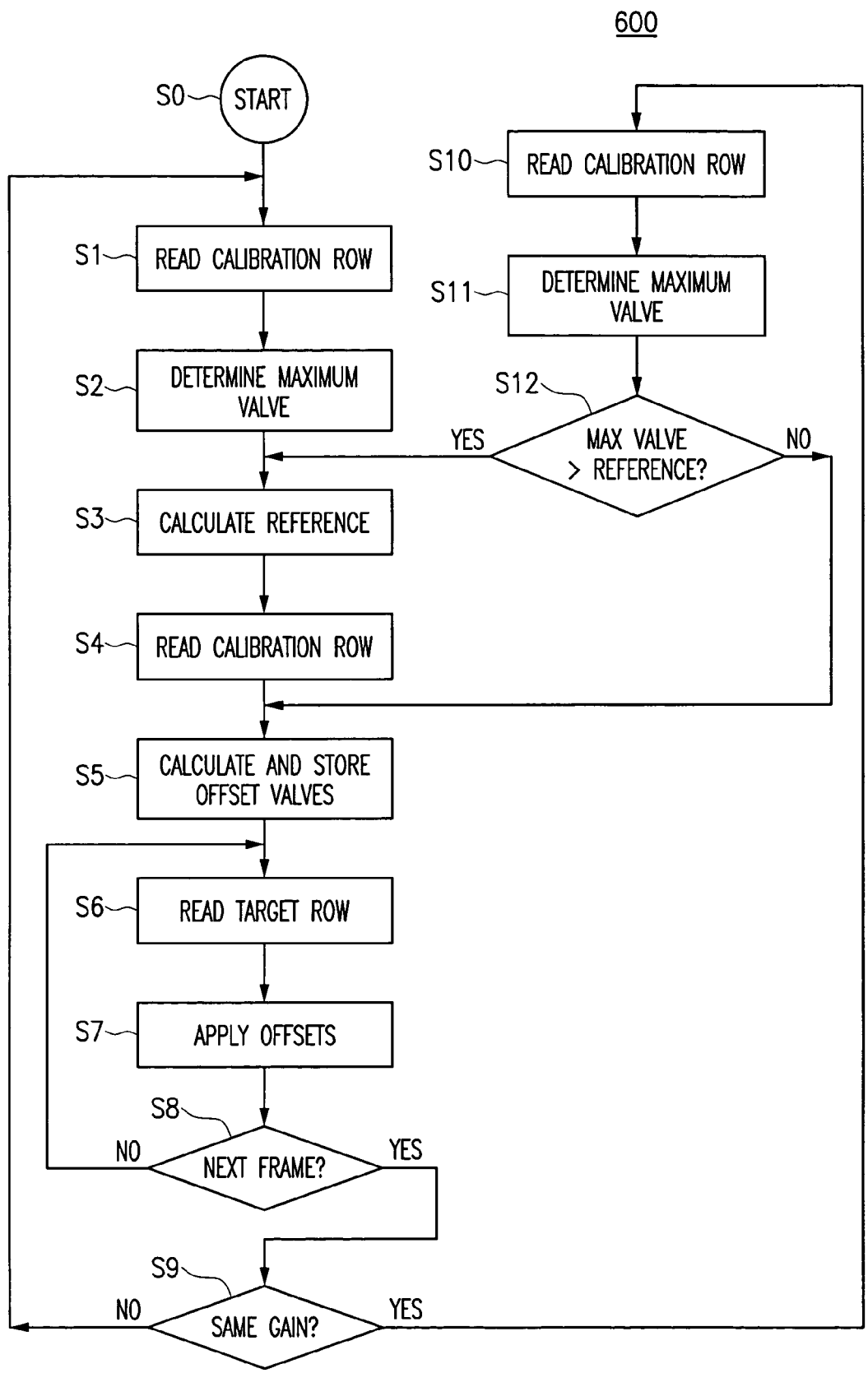
FIG. 6 is a flow chart illustrating the operation of a digital pipeline in the imager of FIG. 4.

FIG. 6 is a flow chart illustrating an exemplary method 600 of operation for a digital pipeline 221' of the column circuitry 220' of FIG. 5. The method 600 begins at step S0 and proceeds directly to step S1.

At step S1, the calibration row 202' (FIG. 4) is read by the plurality of signal chains 301a, 301b. That is, the plurality of signal chains 301a, 301b are operated to receive the reset Vrst and photo Vsig signals from associated calibration pixels 100'. In one exemplary embodiment, each calibration pixel 100' outputs reset Vrst and photo Vsig signals which correspond to a black signal. Accordingly, the analog Vpixel signal, formed from Vrst–Vsig also corresponds to a black signal. The analog Vpixel signal is then digitized and stored in respective digital storage locations 360, as previously discussed in connection with FIG. 5. The method 600 proceeds to step S2.

At step S2, the logic circuit 530 determines the maximum readout value from the calibration row. In the previously discussed exemplary embodiment, the calibration pixels 100' each output signals which correspond to black. Accordingly, each digital value stored in the storage locations 360 is expected to cluster around the zero value. The method 600 proceeds to step S3.

At step S3, a reference level is calculated by the logic circuit 530. In one exemplary embodiment, the reference level is simply the maximum value read from the storage locations 360. I.e., the reference level corresponds to the brightness level of the brightest calibration pixel 100' read from the calibration row 202'. A guard value in the form of a small positive value may also be added to each value to minimize the risk of values subsequently read from the calibration row exceeding the reference level due to minor temporal variations, thus ensuring that the offset values will always be positive. Additionally, separate reference values may be maintained for each color in a color imager. The method 600 proceeds to step S4.

In step S4, the calibration pixels 100' of the calibration row 202' is read again. That is, for each calibration pixel 100', the reset Vrst and photo Vsig signals are read again, the analog pixel signal Vpixel=Vrst–Vsig is formed, digitized, and in memories 360. The method 600 proceeds to step S5.

At step S5, for each column, the offset value is calculated. The value stored in one of the digital storage locations 360 is subtracted from the reference value for that column. This difference forms the initial offset value. During the initial iteration of this process, the initial offset value is the offset value and is stored in the offset memories 520, 521. During subsequent iterations, as long as in step S12 (describe below) the maximum value does not exceed the reference value, the initial value can be combined (for example, averaged) with the previously offset value to form the new offset value, thereby permitting the offset value to be based upon information from multiple frames. The method 600 proceeds to step S6.

At step S6, the reset Vrst and photo Vsig signals from the active row of pixels 100, of the imager 200' is read, the associated analog pixel value Vpixel formed, and then converted into digital form. The method 600 proceeds to step S7.

At step S7, the offset values calculated in step S5 are applied to the digitized Vpixel values from the target row in step S6. In one exemplary embodiment, the values are applied by summing the offset with the digital value correspond to the analog Vpixel voltage formed from reading the reset Vrst and photo Vsig signals from the target row. That is, the digital offset values (from step S5) are added to the digitized Vpixel values of the active row (from step S6). The method 600 proceeds to step S8.

At step S8, the imager 200' has completed the processing of the current row and therefore, another (e.g., the next) row is selected as the active row. If every row in the current frame has been processed, the current frame advances to the next frame and the target row is selected to be the first row. In such situations, the method 600 proceeds to step S9. However, if there are additional rows to be processed in the current frame, the method proceeds to step S6.

At step S9, the logic circuit 530 compares the gain level applied to the gain stage 330 of the signal chains 301a, 301b with the previously used gain levels, and determines whether the gain levels have been changed. If not, the previously calculated offset values are presumed to be valid and the method 600 proceeds to step S10. However, if a different gain is being used, the previously calculated offset values are presumed to be invalid and the method 600 proceeds to step S1.

At step S10, the calibration row is read again (e.g., like step S1). The method 600 proceeds to step S11, where the maximum value is determined (e.g., like step S2). The method 600 proceeds to step S12.

At step S12, the maximum value is compared to the reference value. If the maximum value is greater than the reference value, the reference value is no longer valid and the method 600 proceeds to step S3, so that a new reference value can be determined. If the maximum value is not greater than the reference value, new offsets are calculated when the method 600 proceeds to step S5.

The offset values generated in step S5 are stored in the offset memory 520. In one exemplary embodiment, the imager 200' is a color imager having a color filter array formed above the pixel array 201', and the offset memory 520 comprises of a first memory device 521 and a second memory device 522. Each memory device 521, 522 is respectively used to store offset values associated with a particular one of the column output lines 215 of each signal chain 301a, 301b. For example, memory device 521 may be used to store offset values associated with lines 215 associated with odd pixels, while memory device 522 may be used to store offset values associated with even pixels. The use of two separate memory devices 521, 522 may be advantageous in color imagers because the color filter array typically implements a Bayer pattern, in which alternating pixels of each row are associated with two alternating colors. In such an environment, one memory 521 may be used to store offsets associated with pixels of a first color, while another memory 522 may be used to store offsets associated with pixels of a second color; this provides a mechanism for adjusting offsets on a per-color basis. Additionally, it should be noted that in a color imager, each color may have its own independent gain value. Thus, for a color imager, step S9 determines whether the gain previously used for the same color has been changed, and is performed for each color of the imager.

The present invention is therefore directed to an imaging architecture including a pixel array having a calibration row comprised of calibration pixels and column circuitry that reads the output of the calibration row to obtain a sequence of calibration values which can be applied to digitized pixel signal values.

Figure 7:
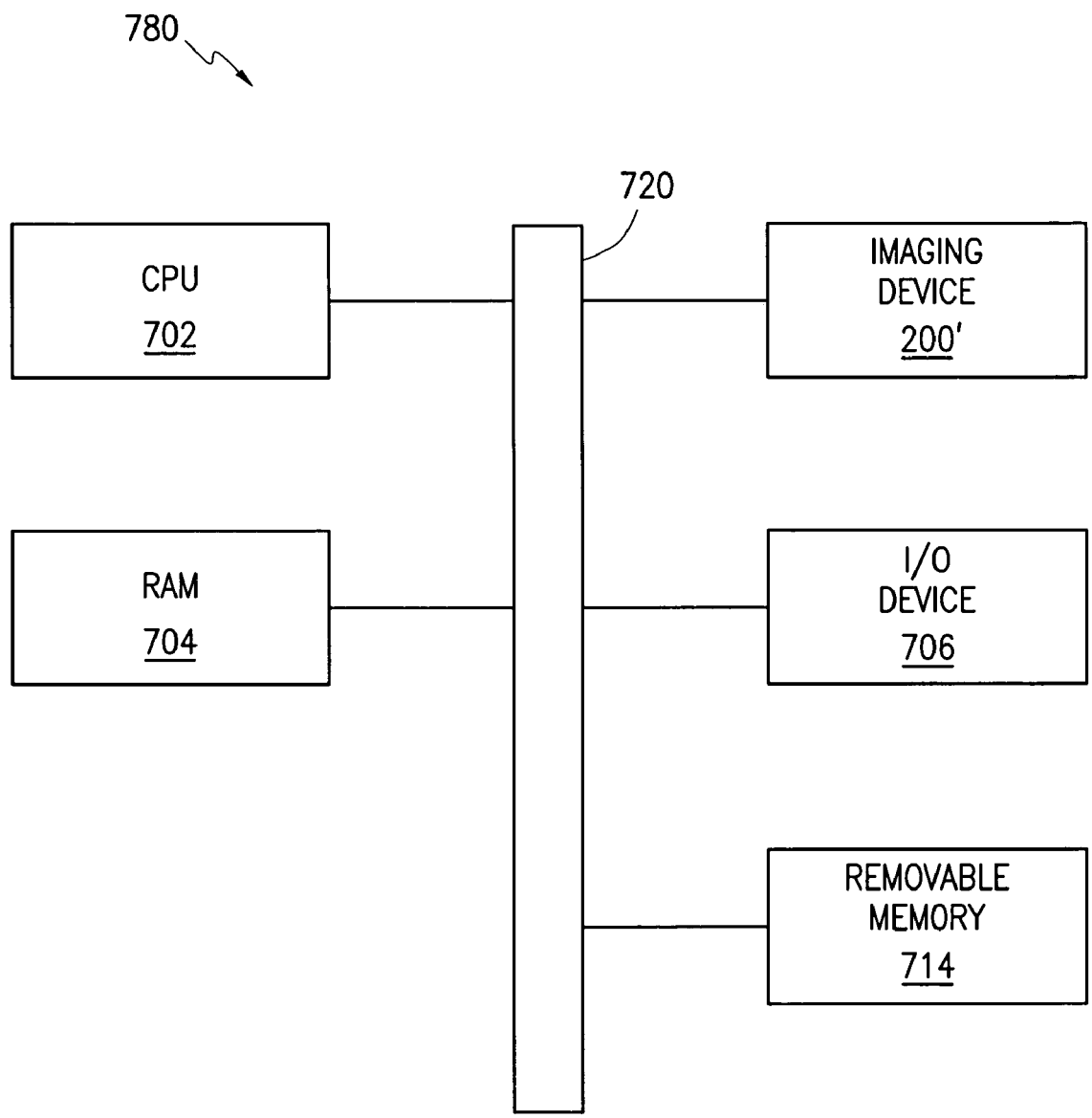
FIG. 7 illustrates a processing system incorporating the imager of the present invention.

FIG. 7 shows system 700, a typical processor system modified to include an imaging device 200' of the invention. The system 700 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, as well as other image based systems.

System 700, for example a camera system, generally comprises a central processing unit (CPU) 702, such as a microprocessor, that communicates with an input/output (I/O) device 706 over a bus 720. Imaging device 200' also communicates with the CPU 702 over the bus 720. The system 700 also includes random access memory (RAM) 704, and can include removable memory 714, such as flash memory, which also communicate with the CPU 702 over the bus 720. The imaging device 200' may be combined with a processor, such as a CPU, digital signal processor, or microprocessor, with or without memory storage on a single integrated circuit or on a different chip than the processor.

It should be appreciated that the imager 200' may be fabricated on an integrated circuit. Other embodiments of the invention therefore include a method of manufacturing an imager 200' having the column circuitry 220'. For example, in one exemplary embodiment, a method of manufacturing an imager include the steps of providing, over a portion of a substrate corresponding to a single integrated circuit, a pixel array including imaging pixels 100 and a row 202' of calibration pixels 100', coupled via column lines 215 to column circuitry 220'. The imaging 100 and calibration 100' pixels, column lines 215, and column circuitry 220' can be fabricated on a same integrated circuit using known semiconductor fabrication techniques.

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A column circuit for an imager, comprising:
    a plurality of column readout lines;
    a plurality of signal chains, each signal chain being associated with N of said plurality of column readout lines, where N is an integer greater than one, each signal chain comprising:
        a multiplexer;
        an analog processor circuit;
        an analog gain circuit;
        an analog-to-digital converter; and
        a demultiplexer;
    at least one memory, said at least one memory containing N respective memory storage areas per signal chain, each of said memory storage areas for storing an offset value associated with a respective one of said plurality of column readout lines; and
    a control circuit, for processing said offset values and said digital pixel readout values processed by said signal chains.

2. The column circuit of claim 1, wherein said control circuit comprises:
    a logic circuit for respectively summing each offset value with an associated digital pixel value.

3. The column circuit of claim 1, wherein said control circuit comprises:
    a logic circuit for respectively calculating each offset value as a difference between a maximum one of said digital pixel values generated from said plurality of column readout lines and a digital pixel value generated from each respective column readout lines.

4. The column circuit of claim 3, wherein said logic circuit is adapted to calculate each offset value when said column circuit is coupled via said plurality of column readout lines to a row of calibration pixels.

5. The column circuit of claim 4, wherein each calibration pixel outputs signals corresponding to a known fixed value.

6. The column circuit of claim 5, wherein said known fixed value approximately corresponds to a black signal.

7. The column circuit of claim 3, wherein said logic circuit also adds a fixed value to each offset value.

8. An imager, comprising:
    a pixel array, said pixel array comprising:
        imaging pixels arranged in a plurality of columns and a plurality of rows; and
        a row of calibration pixels; and
    a column circuit, for receiving analog signals from a selected row of pixels in said pixel array and producing a corresponding set of digital pixel signals, said column circuit comprising:
        a plurality of column readout lines;
        a plurality of signal chains, each signal chain being associated with N of said plurality of column readout lines, where N is an integer greater than one, each signal chain comprising:
            a multiplexer;
            an analog processor circuit;
            an analog gain circuit;
            an analog-to-digital converter; and
            a demultiplexer;
        at least one memory, said at least one memory containing N respective memory storage areas per signal chain, each of said memory storage areas for storing an offset value associated with a respective one of said plurality of column readout lines; and
        a control circuit, for processing said offset values and said digital pixel readout values processed by said signal chains.

9. The imager of claim 8, wherein said control circuit comprises:
a logic circuit for respectively summing each offset value with an associated digital pixel value.

10. The imager of claim 8, wherein said control circuit comprises:
a logic circuit for respectively calculating each offset value as a difference between a maximum one of said digital pixel values generated from said plurality of column readout lines and a digital pixel value generated from each respective column readout lines.

11. The imager of claim 10, wherein said logic circuit is adapted to calculate each offset value when said column circuit is coupled via said plurality of column readout lines to a row of calibration pixels.

12. The imager of claim 11, wherein each calibration pixel outputs signals corresponding to a known fixed value.

13. The imager of claim 12, wherein said known fixed value approximately corresponds to a black signal.

14. The imager of claim 11, wherein said logic circuit also adds a fixed value to each offset value.

15. An imaging system, comprising:
a processor; and
an imaging device, coupled to said processor, said imaging device comprising:
  a pixel array, said pixel array comprising:
    imaging pixels arranged in a plurality of columns and a plurality of rows; and
    a row of calibration pixels; and
  a column circuit, for receiving analog signals from a selected row of pixels in said pixel array and producing a corresponding set of digital pixel signals, said column circuit comprising:
    a plurality of column readout lines;
    a plurality of signal chains, each signal chain being associated with N of said plurality of column readout lines, where N is an integer greater than one, each signal chain comprising:
      a multiplexer;
      an analog processor circuit;
      an analog gain circuit;
      an analog-to-digital converter; and
      a demultiplexer:
    at least one memory, said at least one memory containing N respective memory storage areas per signal chain, each of said memory storage areas for storing an offset value associated with a respective one of said plurality of column readout lines; and
    a control circuit, for processing said offset values and said digital pixel readout values processed by said signal chains.

16. The imaging system of claim 15, wherein said control circuit comprises:
a logic circuit for respectively summing each offset value with an associated digital pixel value.

17. The imaging system of claim 15, wherein said control circuit comprises:
a logic circuit for respectively calculating each offset value as a difference between a maximum one of said digital pixel values generated from said plurality of column readout lines and a digital pixel value generated from each respective column readout lines.

18. The imaging system of claim 17, wherein said logic circuit is adapted to calculate each offset value when said column circuit is coupled via said plurality of column readout lines to a row of calibration pixels.

19. The imaging system of claim 18, wherein each calibration pixel outputs signals corresponding to a known fixed value.

20. The imaging system of claim 19, wherein said known fixed value approximately corresponds to a black signal.

21. The imaging system of claim 17, wherein said logic circuit also adds a fixed value to each offset value.

22. A method of operating an imager having an array of pixels arranged in rows and columns, said method comprising the acts of:
(a) at a first time, reading, in accordance with a current gain, a plurality of calibration values from a row of calibration pixels of said array;
(b) determining a reference value from said plurality of calibration values;
(c) at a second time after said first time, reading, in accordance with said current gain, a second plurality of calibration values from said row of calibration pixels of said array;
(d) calculating and storing, for each column, an offset value based on said reference value and said plurality of calibration values;
(e) setting a target row to a current row;
(f) reading, in accordance with said current gain, a plurality of signal values from said target row to a plurality of signal chains, each signal chain being associated with N of said plurality of column readout lines, where N is an integer greater than one, each signal chain comprising: a multiplexer, an analog processor circuit, an analog gain circuit, an analog-to-digital converter, and a demultiplexer; and
(g) respectively applying said plurality of offset values to said plurality of signal values.

23. The method of claim 22, further comprising:
(h) setting said target row to a next row; and
(i) repeating steps (f), (g), and (h) while said current row and said next row are in a same frame.

24. The method of claim 23, further comprising:
(j) if said current row and said next row are in different frames, and if a current gain is unchanged,
  (j1) reading, in accordance with said current gain, a plurality of calibration values from a row of calibration pixels;
  (j2) determining a maximum value of said plurality of calibration values;
  (j3) if said maximum value is greater than said reference value, proceeding with step (b); and
  (j4) if said maximum value is not greater than said reference value, proceeding with step (d).

25. The method of claim 24, wherein in step (b), said reference value is based on a maximum value of said plurality of calibration values.

26. The method of claim 24, wherein in step (b), said reference value is also based on a predetermined offset value.

27. The method of claim 23, wherein in step (d), each offset value is calculated based on a difference between said reference value and a respective one of said calibration values.

28. The method of claim 22, wherein in step (d) said offset value is also based on a previous offset value.

29. A method for forming an imaging circuit, comprising:
providing a semiconductor substrate;
forming, over said semiconductor substrate, a pixel array, said pixel array comprising:
  imaging pixels arranged in a plurality of columns and a plurality of rows; and a row of calibration pixels; and forming, over said semiconductor substrate, a column circuit for receiving analog signals from a selected row of pixels in said pixel array and producing a corresponding set of digital pixel signals, said column circuit comprising:
- a plurality of column readout lines;
- a plurality of signal chains, each signal chain being associated with N of said plurality of column readout lines, where N is an integer greater than one, each signal chain comprising:
  - a multiplexer;
  - an analog processor circuit;
  - an analog gain circuit;
  - an analog-to-digital converter; and
  - a demultiplexer
- at least one memory, said at least one memory containing N respective memory storage areas per signal chain, each of said memory storage areas for storing an offset value associated with a respective one of said plurality of column readout lines; and
- a control circuit, for processing said offset values and said digital pixel readout values processed by said signal chains.

* * * * *